United States Patent [19]

Wegner et al.

[11] 4,235,569
[45] Nov. 25, 1980

[54] SUBMERSIBLE PUMP FOR RADIOACTIVE LIQUIDS

[76] Inventors: Klaus Wegner, Pfarrer-Hufnagel-Strasse 10, 6450 Hanau 1; Alois Schillinger, Höhenweg 19, 4630 Bochum, both of Fed. Rep. of Germany

[21] Appl. No.: 891,056

[22] Filed: Mar. 28, 1978

[30] Foreign Application Priority Data

Mar. 31, 1977 [DE] Fed. Rep. of Germany ....... 7710103

[51] Int. Cl.² ............................................. F04D 29/60
[52] U.S. Cl. ............................... 415/122 R; 415/501; 417/420; 417/424
[58] Field of Search .................. 417/420, 424, 410; 415/122 R, 501, DIG.3, 199.1

[56] References Cited

U.S. PATENT DOCUMENTS

| | | | |
|---|---|---|---|
| 1,266,552 | 5/1918 | Chapman | 415/501 |
| 1,896,108 | 2/1933 | Simmons | 417/410 |
| 2,504,140 | 4/1950 | Mill | 417/424 |
| 2,577,559 | 12/1951 | Armstrong | 417/13 |
| 3,513,942 | 5/1970 | Sato | 417/420 |
| 3,853,430 | 12/1974 | O'Rourke | 417/424 |
| 4,080,112 | 3/1978 | Zimmermann | 417/420 |

FOREIGN PATENT DOCUMENTS 2618951  11/1976  Fed. Rep. of Germany ........... 417/405

OTHER PUBLICATIONS

Berkeley Pump Co. Bulletin No. 5055, Jan., 1954; Berkeley Pump Co., Atlanta, Ga.

*Primary Examiner*—Robert E. Garrett
*Attorney, Agent, or Firm*—Cushman, Darby & Cushman

[57] ABSTRACT

A submersible pump having a fluid displacement element separated from a motor and a plurality of detachable shaft sections are provided, each of which has, at its opposite ends, a coupling flange and coupling member; when the shaft sections are connected, a fluid displacement member will be coupled through a magnetic coupling to the output of the motor through a drive shaft extending through one of the tubes of each shaft section; each coupling flange at one end of each shaft section is provided with protruding ridges which act as keying elements for cooperation with V-shaped grooves formed on coupling flanges on the opposite end of each shaft section.

9 Claims, 4 Drawing Figures

SUBMERSIBLE PUMP FOR RADIOACTIVE LIQUIDS

BACKGROUND AND BRIEF DESCRIPTION OF THE INVENTION

The present invention relates to submersible pumps and particularly, to submersible pumps for radioactive fluids which present difficult problems both in terms of storage and conveying. The pump of the present invention is of the type that can be submersed into the fluid medium and which can be driven through a magnetic coupling mounted in a housing that is isolated from the motor. A series of shaft sections are provided so that the housing for the fluid displacement member can be submersed to any desired depth in an underground storage tank by coupling the appropriate number of shaft sections together.

With the increasing use of nuclear power generators, storage tanks for the treatment and intermediate storage of radioactive fluids and solutions will become increasingly commonplace. In order to shield the environment and persons working in the vicinity of the stored fluids against radiation, the tanks must be mounted in thick-walled concrete cells. It has been proposed that several such tanks be collected in one storage area with interconnecting plumbing establishing fluid communication between such tanks to facilitate filling and discharge via a conduit system which, itself, must be shielded to prevent radiation leaks. Because of the high level of radiation that can exist in such facilities, it is impossible after filling of the storage tanks, to enter the storage tank cell for making repairs or the like. Repair and maintenance work in areas exposed to radioactive fluid and solutions can be carried out only after thorough flushing of the area including the conduits and pipe fittings. Also, in these systems, it must be possible to fill and discharge the tanks with rigorous safeguards against leakages. Similarly, it is extremely important that in case of a leak developing in a tank, it be possible to quickly transfer the contents of the damaged tank to a reserve tank.

A number of criteria relating to the design and the construction of tanks of this type must be employed which place limitations on the types of liquid pumps that can be employed. For example, many designs require that the tanks be buried in the ground so that any pump that is employed must be able to lift the liquid 10 or more meters in height, while the liquid itself is at a temperature of 60° C. or higher. As a result, the use of self-priming rotary pumps located at ground level becomes impractical. In previously known installations, where pumps are employed for conveying radioactive solutions, steam ejectors or airlift types of pumps have proven useful. However, steam ejectors have the disadvantage that the liquid being pumped is heated by the steam thereby increasing its volume by the amount of the condensed steam. Nevertheless, due to the reliability and simplicity of such arrangements, steam jets have been used as a relatively safe conveying mechanism. On the other hand, pump systems employing air under pressure have not proven as useful when large quantities of liquid must be conveyed, particularly where a vacuum system must be employed to assure that the liquid is pumped to the desired level. Additionally, airlift systems have the disadvantage that radioactive exhaust air develops in unacceptable quantities, thus further complicating the equipment that must be employed. As another solution, compact submersible pumps, where the driving motor is also submersed into the solution to be pumped, have been proposed but use of such has resulted in considerable difficulties because of the requirement of employing expensive radiation resistant seals and electrical insulation materials.

It has also been proposed to use pumps of the type which are lowered into the tank to just above the maximum level of the liquid in the tank. This type of arrangement includes a self-priming pump with a compact receiver for the liquid. One of the drawbacks of this type of arrangement is that the starting operation requires an amount of fluid to be supplied. Moreover, with this type of arrangement, in view of the presently existing possible operating conditions where the liquid may be at or near 60° C. and a 6-meter suction height required, a safe suction of the liquid to be pumped is not always assured.

The pump of the present invention overcomes the foregoing difficulties and provides a very safe pumping system for a radioactive liquid solution contained in a tank. According to the present invention a fluid displacement impeller type pump is disposed at the lowest point in the storage tank so that the required suction will be reduced to a minimum or zero at the start-up of a pumping operation. Further, priming fluid will no longer be necessary and the pump will be able to operate even in the case of a blocked conduit in the pressure line without causing damage to the pump. The fluid being pumped will be safely encased at all times in an exhaust conduit which can be easily drained by a built-in drain hole which leads back to the storage tank. In addition, the parts of the pump system that may need servicing will be readily accessible and can be assembled and disassembled very rapidly in a wide range of storage tanks having different capacities.

Specifically, according to the present invention, there is provided a submersible pump which consists of a fluid displacement element mounted in a housing which is to be totally immersed in the fluid to be pumped. The housing has a magnetic coupling so that the driving element is isolated from the fluid displacement impeller which contacts the radioactive solution. The drive motor and lubricant supply tank are isolated from the radioactive solution and may be at ground level, for example, where the tank is buried. A shaft coupling system for establishing connection between the motor and fluid displacement impeller is supplied which assures the insulation of the drive shaft from the radioactive solution and which also provides a safe connection for the outlet from the impeller housing through which the liquid is to be pumped. In this arrangement, a plurality of shaft sections are provided each of which includes a tube for the drive shaft, a pipe for the liquid being pumped and a lubricant conduit. These three tubes or conduits are joined together at their opposite ends by coupling means. The coupling means of each shaft section includes a coupling flange member which will afford rapid and accurate coupling of the shaft sections together so that the housing containing the fluid displacement impeller can be lowered to any desired depth in a tank.

By making the shaft sections of a manageable length, for example, 0.5 to 2 meters, they can be easily disassembled and replaced in case of damage or a leak occurring along the conveying path.

The foregoing and other advantages will become apparent as consideration is given to the following de-

DETAILED DESCRIPTION OF THE INVENTION

Figure 1:
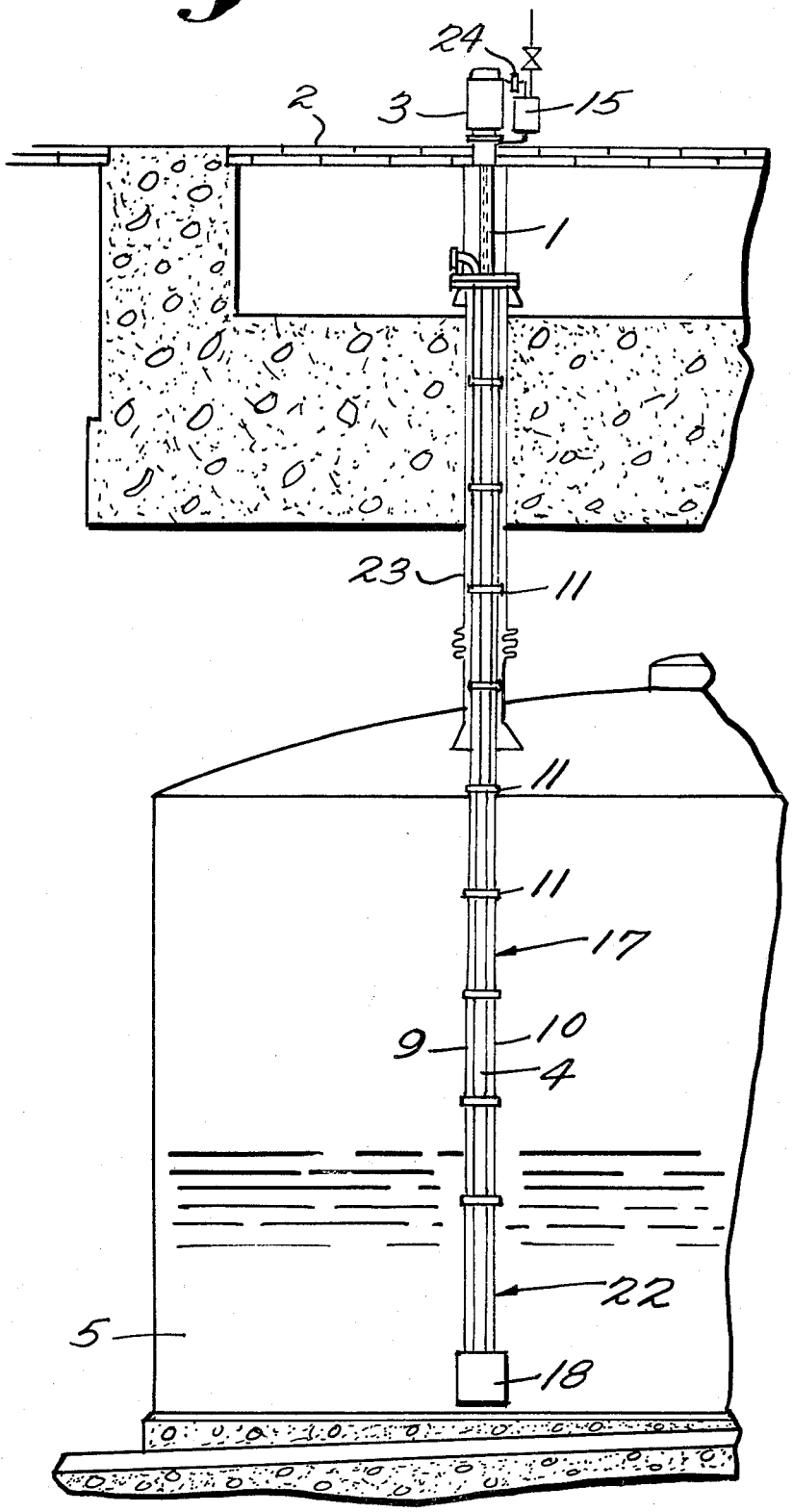
FIG. 1 is a schematic sectional view of a storage tank and the submersible pump and coupled shaft sections of the present invention.
Figure 2:
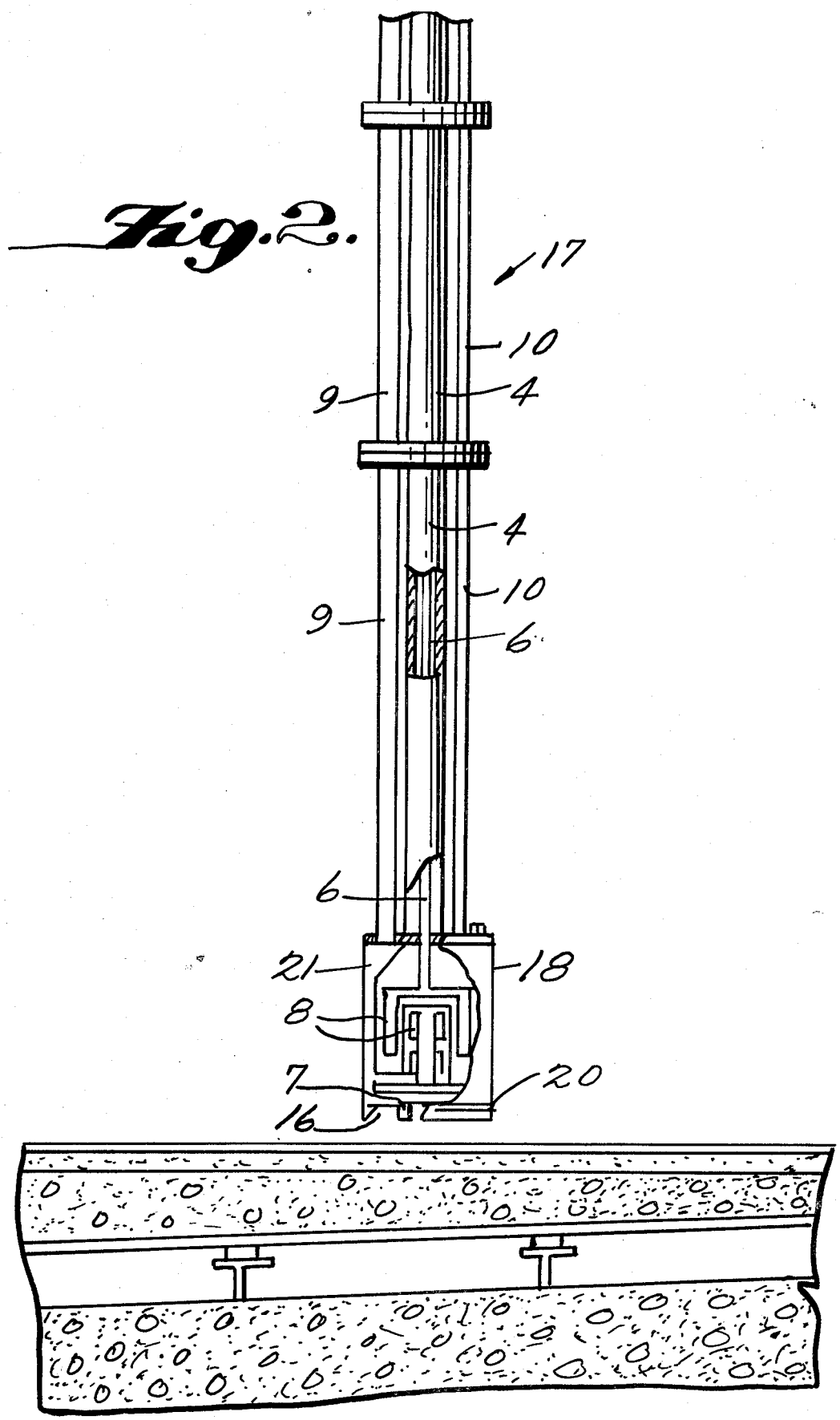
FIG. 2 is an enlarged view of FIG. 1 showing the submersible pump schematically and the coupled shaft sections.
Figure 3:
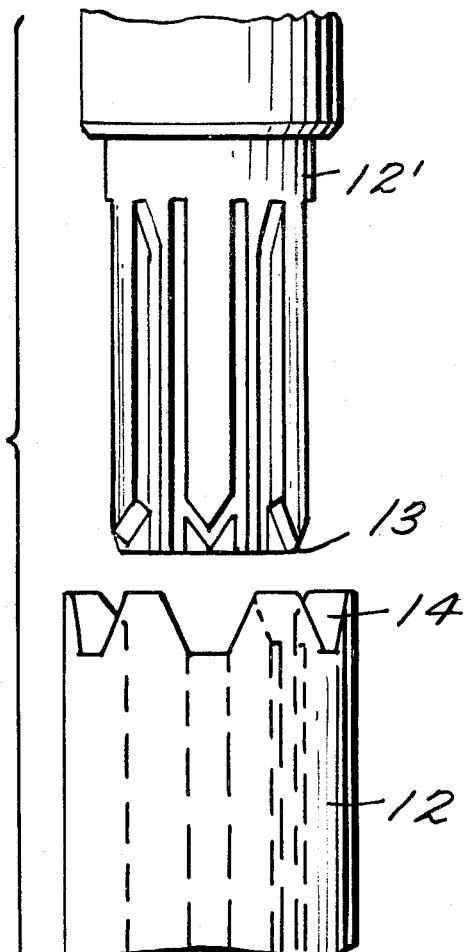
FIG. 3 is a side view in elevation of two of the coupling means of the present invention showing the keying features thereof.

Referring to FIGS. 1 and 2, there is shown a submersible pump which includes a fluid displacement impeller 7 rotatably mounted in a housing 18. A magnetic coupling 8 is provided in the housing 18 through which power is transmitted to the impeller 7 from a motor 3 mounted outside the radioactive area by means of a spacing tube 1 which projects through a covering 2 and includes a long drive shaft 6 which extends through a series of pipes 4, connected as described below, isolating the drive shaft from the radioactive fluid medium 5 that is to be pumped. A conveying pressure pipe 9 and a conduit 10 for a lubricant and the drive shaft pipe 4 are mounted in a series of shaft sections which may be assembled quickly by means of the coupling means in the form of connecting flanges 11 which permit the column to extend from the spacer 1 to the housing 18 to any desired length by adding discrete shaft sections 17. The coupling means also include a receiving member 12 and, at the other end of each shaft section, an insertion member 12', as shown in FIG. 3. The insertion members 12' have key members such as at 13 which are V-shaped at their lower ends. The receiving members 12 have V-shaped grooves which are chamfered as at 14 to facilitate the insertion of the insertion members 12' into the receiving member 12 of an adjacent shaft section.

A supply tank 15 for a lubricant oil is mounted adjacent the motor 3 to provide a quantity of oil by gravity flow to the ball bearings of the drive shaft and the impeller 7. A small pump may be employed in or adjacent the supply tank 15 for pumping the lubricant down through the coupled shaft sections to the impeller 7 and then back to the tank 15. For this purpose, a second lubricant return line (not shown) may be extended through the coupled shaft sections. Also, a second impeller may be mounted on the end of drive shaft 6 in the housing 18 to pump the lubricant back to tank 15.

In order to minimize the possibility of leakage of radioactive material, the drive shaft conduits 4 in which the drive shaft 6 is housed, may be filled with a gas under pressure to prevent the ingress of the liquid medium. This arrangement may be utilized to detect leaks in the conduit 4 by a bubble monitoring device.

In the housing 18, the magnetic coupling 8 includes a magnetic drive element which is connected to the drive shaft 6 and the driven magnetic element which is coupled directly to the fluid displacement impeller 7. A liquid-tight separation between these elements is maintained so that cooling of the impeller 7 and its mounting bearings may be derived from contact with the liquid medium in the storage tank. The liquid medium will enter through the central portion of the housing as at 20 to be pumped up the outside of the housing as at 21 to the exhaust conveying conduit 9. A return duct 16 is provided in the bottom of the housing to return some of the liquid under pressure of the impeller 7 to the tank to protect against the heating up of the rotating part of the pump which may arise during extended operation of the pump or in the case of a blockage in the pressure line 9. Thus, with the arrangement, if such blockage occurs in line 9, impeller 7 will still operate to pump liquid in through opening 20 and then out through the smaller opening 16.

Figure 4:
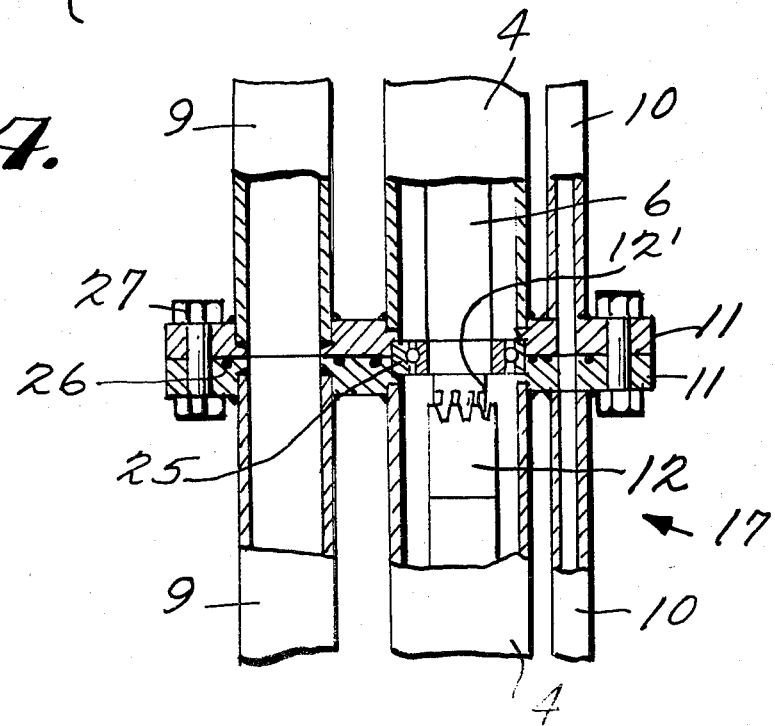
FIG. 4 is an enlarged view of FIG. 1 showing the connection of the flanges with the tubes and the means of sealing the conduits.

In setting up the pump, as noted above, the depth to which the impeller housing 18 is lowered is varied by either adding or removing shaft sections 17 from the assembly. In assembling the column consisting of the plurality of shaft section 17, the insertion member 12' of one section is inserted into the receiving member 12 of an adjacent section and then the coupling flange, of conventional construction, is closed around the joined couplings to hold them together. The three tubes 4, 9 and 10 of each section must, of course, be properly aligned with those of an adjacent shaft section. Referring to FIG. 4, the three tubes 4, 9 and 10 are welded to the flanges 11. Each conduit is separately sealed by a sealing ring 26. The drive shaft 6 is supported by ball bearing 25 in the center of the tube 4. The shaft sections 17 are assembled by fastening the flanges 11 with nuts and screws 27. The shaft section 22 may, of course, be securely attached to the top of housing 18. With this arrangement, it will be evident to those skilled in the art, that repairs due to leaks occurring along the length of the column or damages on the fluid displacement member or on the magnetic coupling can be easily effected by pulling the column out of the insertion tube 23, and dismounting the shaft sections 17 one after the other to the extent necessary to effect the repair.

Temperature monitoring of the lubricant passing through conduit 10 is provided at 24.

Having described the invention, it will be obvious to those skilled in this art that various modifications may be made therein without departing from the spirit and scope of the present invention as defined in the appended claims.

What is claimed is:

1. A submersible pump for radioactive fluids comprising a housing, fluid displacement means rotatably mounted in said housing, a plurality of shaft sections, each shaft section including at least a conduit surrounding a drive shaft member and a separate conduit only for the fluid to be pumped, each conduit of each said shaft section being secured at each end thereof in fluidtight engagement to a coupling means so that, where said coupling means of adjacent shaft sections are coupled together, said drive shaft member conduit and fluid conduit of one shaft section will be in alignment with said respective drive shaft member conduit and fluid conduit of an adjacent shaft section, said respective coupling means of said shaft section including fluid sealing means, said coupling means having bearing means for receiving and rotatably supporting one end of a said drive shaft member, each said drive shaft member having at its end adjacent said bearing means, guide insertion drive transmitting means and, at its opposite end, guide and drive receiving means complementary to said guide insertion drive transmitting means so that, where said respective coupling means of adjacent shaft sections are coupled together, said respective drive shaft members of said adjacent shaft sections will be coupled in drive transmitting relation, motor means for driving said drive shaft members, said housing having magnetic coupling means for transmitting power from a said drive shaft member in engagement therewith to said fluid displacement means.

2. The pump as claimed in claim 1 wherein another conduit for a lubricant for the fluid displacement means is provided.

3. The pump as claimed in claim 1 wherein said guide insertion drive transmitting means of each said drive shaft member comprises an insertion member having a peripheral wall and having guide means thereon comprising raised portions, said guide and drive receiving means comprising a receiving member having an interior wall and guide means thereon in the form of recesses for cooperating with said raised portions on said insertion member.

4. The pump as claimed in claim 1 wherein means are provided for supplying gas under pressure to said conduits for said drive shaft members when said shaft sections are coupled together.

5. The pump as claimed in claim 3 wherein said guide means includes a plurality of different sized key receiving portions, said raised portions on each said insertion member having a V-shaped end section, and said guide means on said receiving member having a V-shaped groove, said V-shaped groove and said V-shaped portions being chamfered complementarily to each other.

6. The pump as claimed in claims 3 or 5 wherein said housing includes at least two openings, one of said openings being located relative to said fluid displacement member so that, when said fluid displacement member is rotated, liquid will be drawn in through said opening while said other opening is located relative to said fluid displacement member so that, when said fluid displacement member is rotated, fluid will be passed out of said housing through said other opening.

7. The pump as claimed in claim 3 wherein said housing includes a shaft section having a receiving member.

8. The pump as claimed in claim 2 wherein a separate pump for said lubricant is provided remote from said housing.

9. The pump as claimed in claim 8 wherein temperature monitoring means are provided for monitoring the temperature of said lubricant.

* * * * *